(12) United States Patent
Noguchi et al.

(10) Patent No.: US 11,327,480 B2
(45) Date of Patent: May 10, 2022

(54) VEHICLE CONTROL SYSTEM

(71) Applicant: HONDA MOTOR CO., LTD., Tokyo (JP)

(72) Inventors: Junpei Noguchi, Wako (JP); Masahiro Kowada, Wako (JP); Miki Tsujino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 16/829,301

(22) Filed: Mar. 25, 2020

(65) Prior Publication Data

US 2020/0310411 A1    Oct. 1, 2020

(30) Foreign Application Priority Data

Mar. 29, 2019 (JP) .............................. JP2019067247

(51) Int. Cl.
*G05D 1/00* (2006.01)
*B60W 30/06* (2006.01)
*B60W 10/04* (2006.01)
*B60W 10/10* (2012.01)
(Continued)

(52) U.S. Cl.
CPC ........... *G05D 1/0016* (2013.01); *B60W 10/04* (2013.01); *B60W 10/10* (2013.01); *B60W 10/18* (2013.01); *B60W 10/20* (2013.01); *B60W 30/06* (2013.01); *B60W 2710/10* (2013.01); *B60W 2710/18* (2013.01); *B60W 2710/20* (2013.01); *B60W 2720/106* (2013.01); *B60W 2720/125* (2013.01);
(Continued)

(58) Field of Classification Search
CPC ........ G05D 1/0016; G05D 2201/0213; B60W 30/06; B60W 10/04; B60W 10/10; B60W 10/18; B60W 10/20; B60W 2720/125; B60W 2720/24; B60W 2710/10; B60W 2710/18; B60W 2710/20; B60W 2720/106; B62D 1/00; B62D 15/0285
USPC .............................................................. 702/2
See application file for complete search history.

(56) References Cited

U.S. PATENT DOCUMENTS 8,958,929 B2    2/2015 Okamura et al.
2013/0311004 A1*  11/2013 Okamura ............. G05D 1/0033
                                              701/2
(Continued)

FOREIGN PATENT DOCUMENTS

JP           5704178 B2    4/2015

*Primary Examiner* — Jonathan M Dager
*Assistant Examiner* — Jean W Charleston
(74) *Attorney, Agent, or Firm* — Armstrong Teasdale LLP

(57) ABSTRACT

A vehicle control system includes: a driving operation device provided in a vehicle and configured to accept a driving operation by a user; an operation terminal configured to be carried by the user and including an input/output unit configured to accept an input by the user and to output a signal; and a control device configured to control traveling of the vehicle based on a signal from the driving operation device and to execute remote parking processing to move the vehicle to a parking position based on a signal from the operation terminal. When the control device detects the driving operation based on a signal from the driving operation device during the remote parking processing, the control device executes suspension processing to stop the vehicle and to make the input/output unit notify that the driving operation device has been operated.

7 Claims, 5 Drawing Sheets

(51) Int. Cl.
  *B60W 10/18* (2012.01)
  *B60W 10/20* (2006.01)
(52) U.S. Cl.
  CPC . *B60W 2720/24* (2013.01); *G05D 2201/0213* (2013.01)

(56) References Cited

U.S. PATENT DOCUMENTS

| | | | |
|---|---|---|---|
| 2014/0222252 A1* | 8/2014 | Matters | G05D 1/0011 |
| | | | 701/2 |
| 2017/0174191 A1* | 6/2017 | Oberheu | B60T 7/16 |
| 2017/0267233 A1* | 9/2017 | Minster | B62D 15/02 |
| 2017/0270796 A1* | 9/2017 | Kawagishi | G08G 1/145 |
| 2018/0050699 A1* | 2/2018 | Gauthier | B60W 50/085 |
| 2018/0053422 A1* | 2/2018 | Altinger | E04H 6/422 |
| 2018/0170367 A1* | 6/2018 | Ohshima | G05D 1/0061 |
| 2018/0265079 A1* | 9/2018 | Nakada | B60W 40/04 |
| 2020/0086852 A1* | 3/2020 | Krekel | B60W 50/14 |

\* cited by examiner

VEHICLE CONTROL SYSTEM

TECHNICAL FIELD

The present invention relates to a vehicle control system that can remotely operate a vehicle by an operation terminal.

BACKGROUND ART

A known vehicle control device moves a vehicle to a parking space by a driving operation from a remote controller (for example, Japanese Patent No. 5704178B2). In this vehicle control device, in a case where a driving operation from inside the vehicle (namely, a driving operation by a driver, such as an acceleration operation, a brake operation, a steering operation, and a shift operation) is detected during the driving operation from the remote controller, the driving operation from the remote controller is canceled, and thereafter, the driving operation from inside the vehicle has priority over the driving operation from the remote controller.

However, such a vehicle control device requires the driving operation from inside the vehicle even though no occupant that can drive the vehicle is inside the vehicle, in a case where the driving operation from inside the vehicle is detected by mistake. Therefore, the vehicle control device may not be convenient.

SUMMARY OF THE INVENTION

In view of such a problem of the prior art, a primary object of the present invention is to provide a vehicle control system that can remotely operate a vehicle by an operation terminal and to improve the convenience of the vehicle control system.

To achieve such an object, one embodiment of the present invention provides a vehicle control system (1) that includes: a driving operation device (11) provided in a vehicle (V) and configured to accept a driving operation by a user; an operation terminal (3) configured to be carried by the user and including an input/output unit (30) configured to accept an input by the user and to output a signal; and a control device (15) configured to control traveling of the vehicle based on a signal from the driving operation device and to execute remote parking processing to move the vehicle to a parking position based on a signal from the operation terminal wherein, when the control device detects the driving operation based on a signal from the driving operation device during the remote parking processing, the control device executes suspension processing to stop the vehicle and to make the input/output unit notify that the driving operation device has been operated.

According to this arrangement, when the driving operation on the driving operation device is detected, the operation terminal notifies that the driving operation has been detected (namely, the operation terminal notifies that the driving operation device has been operated). Therefore, the user using the operation terminal can recognize that the driving operation has been performed from inside the vehicle. At this time, it is possible to make sure that the user using the operation terminal is safe since the vehicle is stopped.

Preferably, in the suspension processing, the control device is configured to make the input/output unit display a resumption button (54) for resuming the remote parking processing and an end button (55) for ending the remote parking processing.

According to this arrangement, the user of the operation terminal can select whether to resume or end the remote parking processing. When the vehicle is stopped for the reason that the driving operation on the driving operation device is detected by mistake, the user of the operation terminal may operate the resumption button to resume the remote parking processing.

Preferably, the control device is configured to actuate a parking brake device when the end button is operated in the suspension processing. Preferably, the control device is configured to set a shift position of a transmission to a parking position when the end button is operated in the suspension processing.

According to these arrangements, the vehicle can be reliably held at a position where the vehicle is stopped.

Preferably, until the vehicle travels a prescribed distance after the control device detects an operation of the resumption button and resumes the remote parking processing, the control device does not execute the suspension processing even when the control device detects the driving operation on the driving operation device.

According to this arrangement, in a case where the control device detects the driving operation by mistake due to a disturbance, it is possible to prevent the remote parking processing from being suspended again by the disturbance.

Preferably, the driving operation device includes at least one of an accelerator pedal (11A), a brake pedal (11B), a steering wheel (11C), and a shift lever (11D).

According to this arrangement, it is possible to detect the driving operation by the driver who is in a vehicle cabin.

The driving operation device may include a steering wheel (11C) configured to rotate according to a steering angle of a wheel.

According to this arrangement, the remote parking processing may be suspended when a wheel abuts against a step or rut on a road surface. Even in such a case, the user can resume the remote parking processing by operating the operation terminal.

Thus, according to one embodiment of the present invention, it is possible to provide a vehicle control system that can remotely operate a vehicle by an operation terminal and to improve the convenience of the vehicle control system.

DESCRIPTION OF THE PREFERRED EMBODIMENT(S)

In the following, a vehicle control system according to embodiments of the present invention is described with reference to the drawings.

Figure 1:
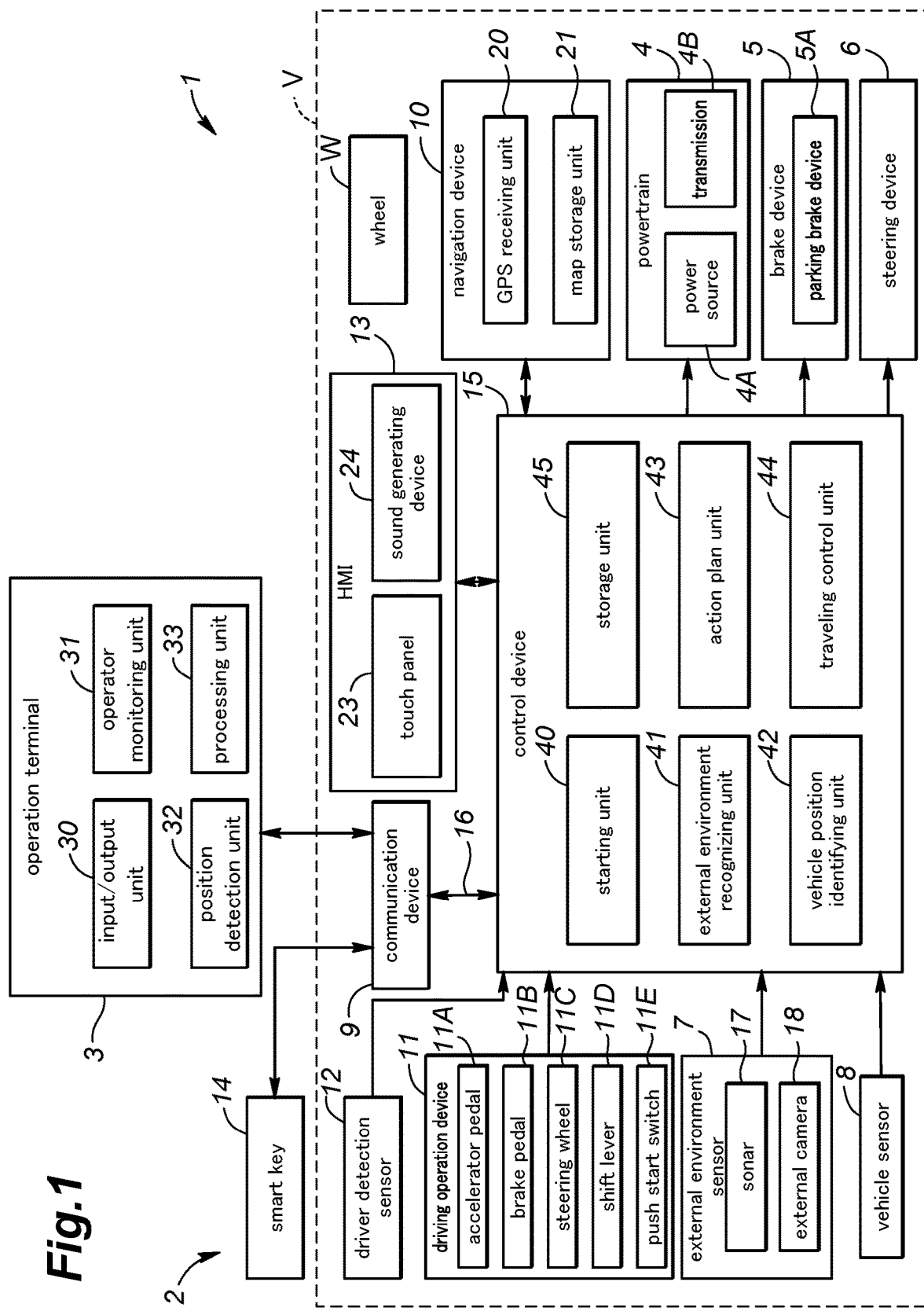
FIG. 1 is a functional block diagram of a vehicle control system according to an embodiment of the present invention.

First, a vehicle control system 1 according to an embodiment is described. As shown in FIG. 1, the vehicle control system 1 includes a vehicle system 2 and at least one operation terminal 3. The vehicle system 2 includes a powertrain 4, a brake device 5, a steering device 6, an external environment sensor 7, a vehicle sensor 8, a communication device 9, a navigation device 10, a driving operation device 11, a driver detection sensor 12, an HMI 13, a smart key 14, and a control device 15. The above components of the vehicle system 2 are connected to each other by communication means such as a controller area network 16 (CAN) so that a signal can be transmitted between the above components. The above components of the vehicle system 2 except the smart key 14 are mounted to the vehicle V.

The powertrain 4 is a device that applies a driving force to the vehicle V. The powertrain 4 includes a power source 4A and a transmission 4B, for example. The power source 4A includes at least one of an internal combustion engine such as a gasoline engine and a diesel engine and an electric motor. The brake device 5 is a device that applies a brake force to the vehicle V. For example, the brake device 5 includes a brake caliper that presses a brake pad against a brake rotor and an electric cylinder that supplies an oil pressure to the brake caliper. The brake device 5 includes a parking brake device 5A that restricts rotations of wheels W via wire cables. The steering device 6 is a device for changing a steering angle of the wheels W. For example, the steering device 6 includes a rack-and-pinion mechanism that steers (turns) the wheels W and an electric motor that drives the rack-and-pinion mechanism. The powertrain 4, the brake device 5, and the steering device 6 are controlled by the control device 15.

The external environment sensor 7 is a sensor that detects electromagnetic waves, sound waves, and the like from the periphery of the vehicle V to detect an object outside the vehicle V. The external environment sensor 7 includes sonars 17 and external cameras 18. The external environment sensor 7 may further include a millimeter wave radar or a laser lidar. The external environment sensor 7 outputs a detection result to the control device 15.

Each sonar 17 consists of a so-called ultrasonic sensor. Each sonar 17 emits ultrasonic waves around the vehicle V and captures the ultrasonic waves reflected by the object to detect a position (distance and direction) of the object. A plurality of sonars 17 are provided at a rear part and a front part of the vehicle V, respectively. In the present embodiment, two pairs of sonars 17 are provided on left and right sides of a rear bumper, two pairs of sonars 17 are provided on left and right sides of a front bumper, and one pair of sonars 17 are provided at front and rear ends of each of left and right faces of the vehicle V. That is, the vehicle V is provided with six pairs of sonars in total. The sonars 17 provided on the rear bumper mainly detect a position of an object behind the vehicle V. The sonars 17 provided on the front bumper mainly detect a position of an object in front of the vehicle V. The sonars 17 provided at the front ends of the left and right faces of the vehicle V detect a position of an object on left and right outsides of the front end of the vehicle V, respectively. The sonars 17 provided at the rear ends of the left and right faces of the vehicle V detect a position of an object on left and right outsides of the rear end of the vehicle V, respectively.

The external cameras 18 are devices that capture images around the vehicle V. Each external camera 18 consists of a digital camera using a solid imaging element such as a CCD or a CMOS, for example. The external cameras 18 include a front camera that captures an image of the front of the vehicle V and a rear camera that captures an image of the rear of the vehicle V. The external cameras 18 include a pair of left and right door mirror cameras 18A, 18B that are provided in the vicinity of the door mirrors of the vehicle V to capture images behind left and right sides of the vehicle V. The external cameras 18 may include a pair of left and right pillar cameras provided on center pillars (B pillars) of the vehicle V to capture images of left and right outsides of the vehicle V.

The vehicle sensor 8 includes a vehicle speed sensor that detects the speed of the vehicle V, an acceleration sensor that detects the acceleration of the vehicle V, a yaw rate sensor that detects the angular velocity around a vertical axis of the vehicle V, and a direction sensor that detects the direction of the vehicle V. For example, the yaw rate sensor consists of a gyro sensor.

The communication device 9 mediates (relays) wireless communication between the control device 15 and the operation terminal 3. Thereby, the control device 15 can communicate with the operation terminal 3 carried by the user via the communication device 9. The communication device 9 may utilize a known communication method such as infrared communication or Bluetooth (registered trademark), for example.

The navigation device 10 is a device that obtains a current position of the vehicle V and provides route guidance to a destination and the like. The navigation device 10 includes a GPS receiving unit 20 and a map storage unit 21. The GPS receiving unit 20 identifies a position (latitude and longitude) of the vehicle V based on a signal received from an artificial satellite (positioning satellite). The map storage unit 21 consists of a known storage device such as a flash memory or a hard disk, and stores map information.

The driving operation device 11 is provided in a vehicle cabin of the vehicle V and accepts an input operation (driving operation) by the driver (user) to control the vehicle V. The driving operation device 11 includes an accelerator pedal 11A, a brake pedal 11B, a steering wheel 11C, a shift lever 11D, and a push start switch 11E (engine start button). The push start switch 11E accepts a starting operation of the vehicle V (input operation to start operation of the vehicle V) by the driver. The driving operation device 11 may further include an element to activate the parking brake device 5A. The driving operation device 11 includes a sensor that detects an operation amount of the input operation, and outputs a signal indicating the operation amount of the input operation to the control device 15.

The driver detection sensor 12 is a sensor to detect that the driver (user) is sitting on a driver's seat. For example, the driver detection sensor 12 consists of a seat sensor provided on a seat surface of the driver's seat. The seat sensor may consist of a capacitance-type sensor to detect a change in capacitance, or may consist of a membrane-type switch that is turned on when the driver sits on the driver's seat. Alternatively, the driver detection sensor 12 may consist of an indoor camera that captures an image of the driver sitting on the driver's seat. Alternatively, the driver detection sensor 12 may consist of a seat belt sensor to detect that the driver fastens a seat belt of the driver's seat based on information as to whether a tongue of the seat belt is inserted into a buckle thereof. The driver detection sensor 12 outputs a detection result to the control device 15.

The HMI 13 notifies the user of various kinds of information by a display or a voice, and accepts an input operation by the user. For example, the HMI 13 includes a touch panel 23 that accepts the input operation by the user and a sound generating device 24 such as a buzzer and a speaker. The touch panel 23 includes a liquid crystal display, an organic EL display, and the like.

The control device 15 consists of an electronic control device (ECU) that includes a CPU, a nonvolatile memory such as a ROM, a volatile memory such as a RAM, and the like. The CPU executes operation processing according to a program so that the control device 15 executes various types of vehicle control. The control device 15 may be composed of one piece of hardware, or may be composed of a unit including plural pieces of hardware. Further, the functions of the control device 15 may be at least partially executed by hardware such as an LSI, an ASIC, and an FPGA, or may be executed by a combination of software and hardware.

The smart key 14 (FOB key) is a known wireless terminal that can be carried by the user. The smart key 14 can communicate with the control device 15 from outside the vehicle V via the communication device 9. The smart key 14 includes a button to accept input by the user. The user can release a door lock and start the operation of the vehicle V by operating the button of the smart key 14.

The operation terminal 3 consists of a wireless terminal that can be carried by the user, and can communicate with the control device 15 from outside the vehicle V via the communication device 9. In the present embodiment, the operation terminal 3 consists of a smartphone. A prescribed application is installed on the operation terminal 3 in advance so that the operation terminal 3 can communicate with the control device 15. The operation terminal 3 is provided with a terminal ID, which is a prescribed numerical value to identify the operation terminal 3.

As shown in FIG. 1, the operation terminal 3 includes an input/output unit 30, an operator monitoring unit 31, a position detection unit 32, and a processing unit 33.

The input/output unit 30 provides information to the user operating the operation terminal 3, and accepts input by the user operating the operation terminal 3. The input/output unit 30 consists of a touch panel, for example. When the input/output unit 30 accepts the input by the user, the input/output unit 30 outputs a signal corresponding to the input to the processing unit 33.

The operator monitoring unit 31 is a unit that captures an image of the user operating the operation terminal 3. The operator monitoring unit 31 consists of a digital camera using a solid imaging element such as a CMOS, for example. The operator monitoring unit 31 is provided at a position to capture an image of a face including eyes of the user performing the input to the input/output unit 30.

The position detection unit 32 obtains positional information of the operation terminal 3. The position detection unit 32 may obtain the positional information of the operation terminal 3 by receiving a signal from a geodetic satellite (GPS satellite), for example. Alternatively, the position detection unit 32 may obtain information about a position of the operation terminal 3 relative to the vehicle V by communicating with the control device 15 via the communication device 9. The position detection unit 32 outputs the obtained positional information of the operation terminal 3 to the processing unit 33.

The processing unit 33 sends the control device 15 the signal from the input/output unit 30, the image of the user captured by the operator monitoring unit 31, and the positional information of the operation terminal 3 obtained by the position detection unit 32. Also, when the processing unit 33 receives a signal from the control device 15, the processing unit 33 processes the signal from the control device 15 and makes the input/output unit 30 provide information to the user operating the operation terminal 3. The input/output unit 30 may provide the information to the user by displaying the information thereon, for example.

The control device 15 can start the operation of the vehicle V (namely, the driving of the powertrain 4) based on a signal from the operation terminal 3. Also, the control device 15 can move the vehicle V to a prescribed position and park the vehicle V there based on a signal from the operation terminal 3. To control the vehicle V at this time, the control device 15 at least includes a starting unit 40, an external environment recognizing unit 41, a vehicle position identifying unit 42, an action plan unit 43, a traveling control unit 44, and a storage unit 45.

The starting unit 40 executes authentication of the smart key 14 based on a signal from the push start switch 11E included in the driving operation device 11. Also, the starting unit 40 determines whether the smart key 14 is located in the vehicle V. In a case where the authentication of the smart key 14 succeeds and the starting unit 40 determines that the smart key 14 is located inside the vehicle V, the starting unit 40 starts the driving of the powertrain 4 (namely, the starting unit 40 starts the operation of the vehicle V). Also, in a case where the control device 15 receives a signal that instructs a start of the operation of the vehicle V from the operation terminal 3, the starting unit 40 executes authentication of the operation terminal 3. In a case where the authentication of the operation terminal 3 succeeds, the starting unit 40 starts the driving of the powertrain 4 (namely, the starting unit 40 starts the operation of the vehicle V). In a case where the powertrain 4 includes an internal combustion engine, the starting unit 40 turns on an ignition device when the starting unit 40 starts the driving of the powertrain 4.

The external environment recognizing unit 41 recognizes an obstacle (for example, a parked vehicle or a wall) located around the vehicle V based on the detection result of the external environment sensor 7, and thereby obtains information about the obstacle. Further, the external environment recognizing unit 41 analyzes an image captured by the external cameras 18 based on a known image analysis method such as pattern matching, and thereby determines whether the obstacle is present and obtains the size of the obstacle in a case where the obstacle is present. Further, the external environment recognizing unit 41 may compute a distance to the obstacle based on signals from the sonars 17 to obtain the position of the obstacle.

The vehicle position identifying unit 42 identifies the position of the vehicle V based on a signal from the GPS receiving unit 20 of the navigation device 10. Further, the vehicle position identifying unit 42 may obtain the vehicle speed and yaw rate of the vehicle V from the vehicle sensor 8, in addition to the signal from the GPS receiving unit 20, to identify the position and posture of the vehicle V by so-called inertial navigation.

The external environment recognizing unit 41 analyzes the detection result of the external environment sensor 7 (more specifically, the images captured by the external cameras 18) based on a known image analysis method such as pattern matching, and thereby recognizes a position of a white line on a road surface of a parking area, for example.

The traveling control unit 44 controls the powertrain 4, the brake device 5, and the steering device 6 based on a traveling control instruction from the action plan unit 43 to make the vehicle V travel.

The storage unit 45 consists of a RAM and the like, and stores information necessary for executing processing of the action plan unit 43 and the traveling control unit 44.

When the HMI 13 or the operation terminal 3 accepts an input by the user, the action plan unit 43 computes a trajectory (traveling route) of the vehicle V and outputs the traveling control instruction to the traveling control unit 44, if necessary.

Figure 2:
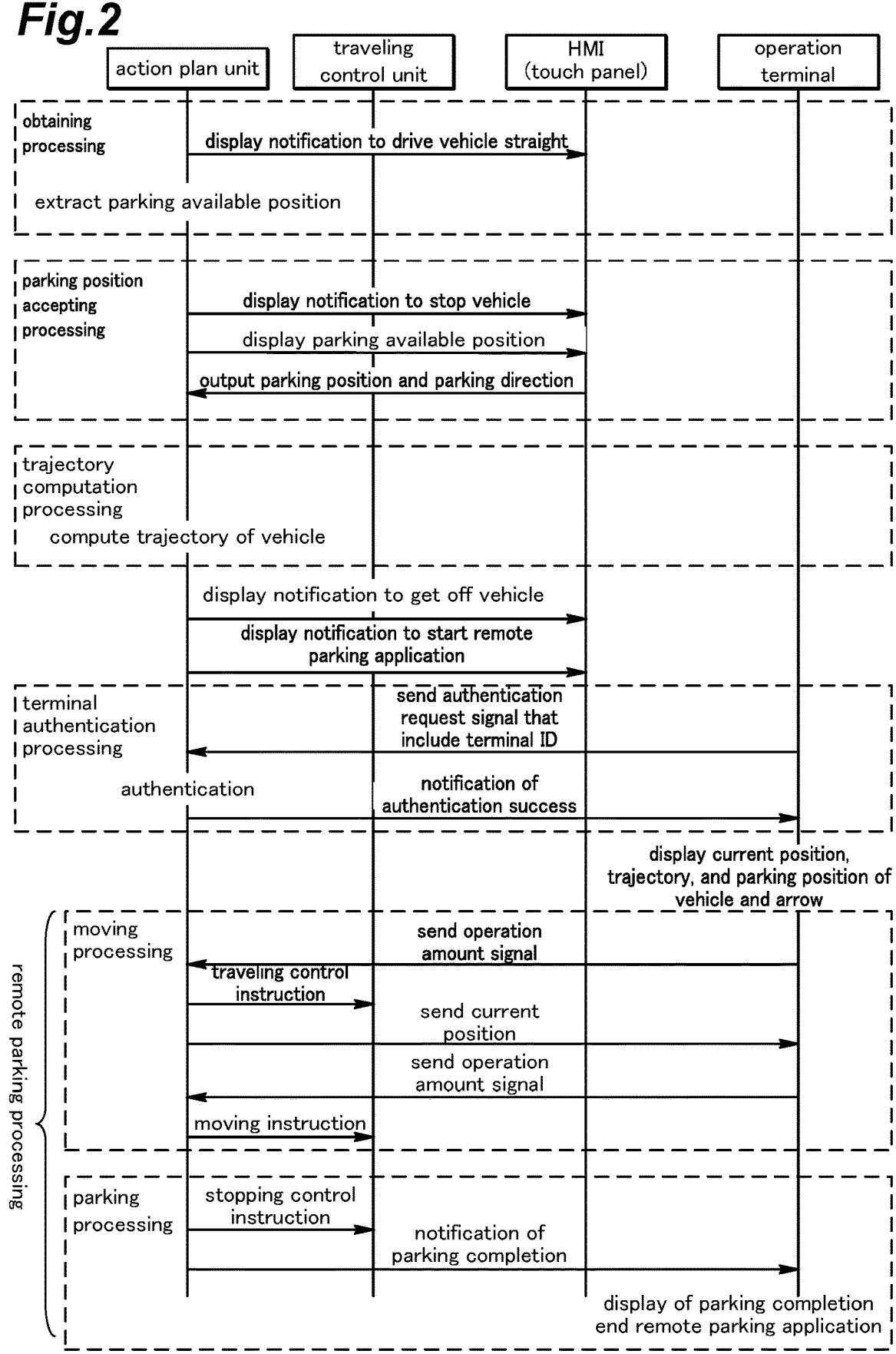
FIG. 2 is a sequence diagram of parking assist processing.

After the vehicle V has stopped, the action plan unit 43 executes parking assist processing, when the user performs an input corresponding to desire for parking assistance by a remote operation. In the following, the parking assist processing will be described with reference to a sequence diagram of FIG. 2.

First, the action plan unit 43 executes obtaining processing to obtain at least one space to park the vehicle V (hereinafter referred to as "parking available position"). Specifically, the action plan unit 43 makes the touch panel 23 of the HMI 13 display a notification that instructs the driver to drive the vehicle V straight. While the driver is driving the vehicle V straight, the action plan unit 43 obtains the position and size of the obstacle and the position of the white line on the road surface based on the signal from the external environment sensor 7. The action plan unit 43 extracts the at least one parking available position based on the position and size of the obstacle and the position of the white line.

Next, the action plan unit 43 executes parking position accepting processing to accept a selection of a position to park the vehicle V (hereinafter referred to as "parking position") from the at least one parking available position. More specifically, the action plan unit 43 makes the touch panel 23 display a notification that instructs the user to stop the vehicle V, in a case where the action plan unit 43 extracts the at least one parking available position in the above obtaining processing. At this time, the action plan unit 43 may make the touch panel 23 also display a notification that instructs the user to change a position of the shift lever 11D to the parking position after the vehicle V has stopped.

Next, the action plan unit 43 makes the touch panel 23 display the current position of the vehicle V and the at least one parking available position. At this time, the action plan unit 43 may make the touch panel 23 display the current position of the vehicle V and the at least one parking available position on the image obtained by the external cameras 18. Thereafter, the action plan unit 43 makes the touch panel 23 display a notification that instructs the user to select the parking position from the at least one parking available position. When the user inputs a desired parking position to the touch panel 23, the touch panel 23 outputs a signal corresponding to the inputted parking position to the action plan unit 43. At this time, the action plan unit 43 may identify the desired parking position based on a position where the user touches the touch panel 23. At this time, the action plan unit 43 makes the touch panel 23 display a button for the user to select a parking direction (a forward parking direction or a backward parking direction). At this time, the action plan unit 43 may simply compute a pair of routes from the current position of the vehicle V to the parking position such that each route corresponds to the forward parking direction or the backward parking direction, and may make the touch panel 23 display the pair of routes. In such a case, the touch panel 23 may permit the user to select the parking direction by touching one of the pair of routes, and may output the selection result (namely, selected parking direction) to the action plan unit 43.

Next, when the action plan unit 43 receives the parking position inputted by the user from the touch panel 23, the action plan unit 43 executes trajectory computation processing to compute a trajectory of the vehicle V from the current position to the parking position. In a case where the user performs the input to select the parking direction, the action plan unit 43 may compute the trajectory of the vehicle V based on not only the current position and the parking position but also the parking direction selected by the user.

When the computation of the trajectory of the vehicle V is completed, the action plan unit 43 makes the touch panel 23 display a notification that urges the user to get off the vehicle V and a notification that instructs the user to start dedicated application software for the remote parking processing (hereinafter referred to as "remote parking application") in the operation terminal 3. According to these notifications, the user gets off the vehicle V, and then starts the remote parking application in the operation terminal 3.

Thereafter, the input/output unit 30 of the operation terminal 3 displays an input button to connect the operation terminal 3 to the vehicle V and to start the authentication of the operation terminal 3. When the user operates (for example, touches or pushes) the input button, the operation terminal 3 is connected to the vehicle V and the action plan unit 43 executes terminal authentication processing to execute the authentication of the operation terminal 3 connected to the vehicle V. In the terminal authentication processing, the operation terminal 3 sends the action plan unit 43 an authentication request signal that includes the terminal ID of the operation terminal 3, and the action plan unit 43 executes the authentication (determination) of the operation terminal 3 based on the terminal ID of the operation terminal 3. When the action plan unit 43 succeeds in the authentication of the operation terminal 3, the action plan unit 43 sends a signal to notify authentication success to the operation terminal 3, and then the input/output unit 30 of the operation terminal 3 displays the current position, trajectory, and parking position of the vehicle V and a vertical arrow. Thereby, the user can instruct the action plan unit 43 to execute the remote parking processing by performing the input to the input/output unit 30 of the operation terminal 3. The remote parking processing includes moving processing to move the vehicle V from the current position to the parking position and parking processing to park the vehicle V at the parking position.

When the user swipes (operates) a button (for example, the vertical arrow) displayed on the input/output unit 30 of the operation terminal 3, the operation terminal 3 sends an operation amount signal corresponding to a swipe amount (operation amount) of the vertical arrow to the action plan unit 43. The action plan unit 43 converts the operation amount signal into a moving amount of the vehicle V and executes the moving processing to move the vehicle V along the trajectory by the computed moving amount until the vehicle V reaches the parking position. In the moving processing, the action plan unit 43 sends the traveling control instruction to the traveling control unit 44, and sends the current position of the vehicle V to the operation terminal 3.

During this moving processing, the action plan unit 43 determines whether the vehicle V has reached the parking position. When the action plan unit 43 determines that the vehicle V has reached the parking position, the action plan unit 43 executes the parking processing to park the vehicle V. In this parking process, the action plan unit 43 first sends a stopping control instruction to the traveling control unit 44 to activate the brake device 5. Thereafter, the action plan unit 43 activates the parking brake device 5A. When the parking processing is completed, the action plan unit 43 sends a notification of parking completion, which indicates that the parking processing has been completed, to the operation terminal 3.

When the operation terminal 3 receives the notification of parking completion, the input/output unit 30 of the operation terminal 3 displays a notification to indicate that the parking of the vehicle V has been completed, and the operation terminal 3 ends the remote parking application. Thereby, the parking assist processing is completed.

Figure 3:
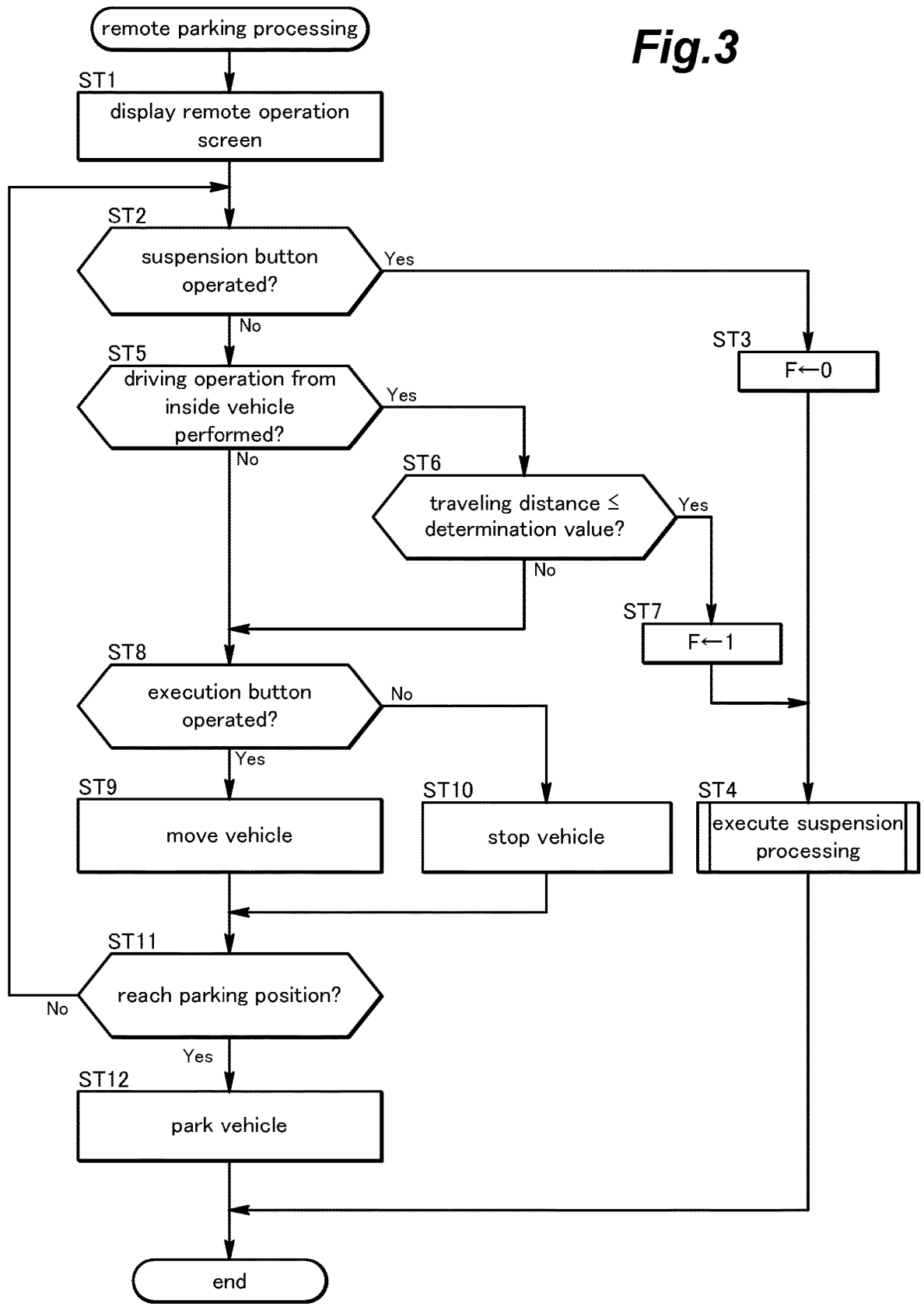
FIG. 3 is a flow chart of remote parking processing.

In the vehicle control system 1 according to the present embodiment, when the control device 15 detects the driving operation based on a signal from the driving operation device 11 during the remote parking processing, the control device 15 executes suspension processing to stop the vehicle V and to make the input/output unit 30 notify the user that the driving operation device 11 has been operated. In the following, the remote parking processing and the suspension processing are described with reference to FIGS. 3 and 4.

As described above, the action plan unit 43 determines the parking position and the trajectory of the vehicle V from the current position of the vehicle V to the parking position before executing the remote parking processing. In the remote parking processing, the action plan unit 43 first makes the input/output unit 30 of the operation terminal 3 display a remote operation screen 50 (step ST1). As shown in FIG. 5A, an execution button 51 and a suspension button 52 are displayed on the remote operation screen 50 of the input/output unit 30, which consists of a touch panel display. The execution button 51 is a button for traveling the vehicle V to the parking position. The suspension button 52 is a button for suspending the remote parking processing. The execution button 51 may consist of, for example, a linear or circular arrow that accepts a swipe operation by the user. Alternatively, the execution button 51 may consist of, for example, a button that accepts a tap operation or a press-and-hold operation by the user. At least one of a color, shape, and movement of the execution button 51 may change when the execution button 51 accepts an operation by the user. The suspension button 52 may consist of, for example, a button that accepts a tap operation by the user.

Next, the action plan unit 43 determines whether the suspension button 52 displayed on the input/output unit 30 has been operated based on a signal from the input/output unit 30 (step ST2). In a case where the action plan unit 43 determines that the suspension button 52 has been operated (in a case where the determination result of step ST2 is Yes), the action plan unit 43 sets a flag F to zero (step ST3), and subsequently executes the suspension processing (step ST4). In the suspension processing, the action plan unit 43 temporarily suspends the remote parking processing (the remote operation of the vehicle V to the parking position) and stops the vehicle V. The details of the suspension processing is described later. The flag F indicates a factor used in the suspension processing, and is set to one of zero and one.

In a case where the action plan unit 43 determines that the suspension button 52 has not been operated (in a case where the determination result in step ST2 is No), the action plan unit 43 determines whether the driving operation from inside the vehicle V has been performed (step ST5). The action plan unit 43 detects the driving operation from inside the vehicle V based on a signal from the driving operation device 11. Preferably, the action plan unit 43 may detect the driving operation from inside the vehicle V based on a signal from at least one of the accelerator pedal 11A, the brake pedal 11B, the steering wheel 11C, and the shift lever 11D included in the driving operation device 11. For example, the action plan unit 43 may determine whether the displacement amount (operation amount) of the accelerator pedal 11A is equal to or more than a prescribed determination threshold based on a signal from the accelerator pedal 11A included in the driving operation device 11. In a case where the displacement amount of the accelerator pedal 11A is equal to or more than the determination threshold, the action plan unit 43 may determine that the driving operation from inside the vehicle V has been performed. Similarly, in a case where the displacement amount of any one of the brake pedal 11B, the steering wheel 11C, and the shift lever 11D is equal to or more than a determination threshold which is set corresponding to each of these elements, the action plan unit 43 may determine that the driving operation from inside the vehicle V has been performed.

In a case where the action plan unit 43 determines that the driving operation from inside the vehicle V has been performed (in a case where the determination result of step ST5 is Yes), the action plan unit 43 determines whether a traveling distance from a previous suspension position is equal to or less than a prescribed determination value (step ST6). The suspension position is a position where the vehicle V is stopped due to the suspension processing. The determination value may be set to a value within a range of 10 cm to 1 m, for example. Incidentally, in a case where the action plan unit 43 has not yet executed the suspension processing in the current remote parking processing, the previous suspension position does not exist. Therefore, the action plan unit 43 determines No in step ST6.

In a case where the action plan unit 43 determines that the traveling distance from the previous suspension position is equal to or less than the determination value (in a case where the determination result of step ST6 is Yes), the action plan unit 43 sets the flag F to one (step ST7), and then executes the suspension processing (step ST4).

In a case where the action plan unit 43 determines that the driving operation from inside the vehicle V has not been performed (in a case where the determination result of step ST5 is No) or in a case where the action plan unit 43 determines that the traveling distance from the previous suspension position is more than the determination value (in a case where the determination result in step ST6 is No), the action plan unit 43 determines whether the execution button 51 has been operated (step ST8). In a case where the action plan unit 43 determines that the execution button 51 has been operated (in a case where the determination result of step ST8 is Yes), the action plan unit 43 moves the vehicle V along the trajectory set in advance (step ST9). The action plan unit 43 outputs a command to the traveling control unit 44 to make the traveling control unit 44 control the powertrain 4 and the steering device 6. At this time, the action plan unit 43 may set the moving amount of the vehicle V according to the operation amount of the execution button 51. For example, the action plan unit 43 may increase the moving amount of the vehicle V as the operating duration of the execution button 51 increases.

In a case where the action plan unit 43 determines that the execution button 51 has not been operated (in a case where the determination result of step ST8 is No), the action plan unit 43 stops the vehicle V (step ST10). Specifically, the action plan unit 43 outputs a command to the traveling control unit 44 to make the traveling control unit 44 control the brake device 5.

Subsequent to the processing in ST9 or ST10, the action plan unit 43 determines whether the vehicle V has reached the parking position (step ST11). The action plan unit 43 may determine whether the vehicle V has reached the parking position based on a signal from the external environment sensor 7 and the position of the vehicle V obtained from the navigation device 10. In a case where the action plan unit 43 determines that the vehicle V has not reached the parking position (in a case where the determination result of step ST11 is No), the action plan unit 43 executes step ST2 and the steps thereafter again.

In a case where the action plan unit 43 determines that the vehicle V has reached the parking position (in a case where the determination result of step ST11 is Yes), the action plan unit 43 stops and then parks the vehicle V (step ST12). Specifically, the action plan unit 43 outputs a command to the traveling control unit 44, thereby the traveling control unit 44 activates the disk brake device included in the brake device 5 to stop the vehicle V, and then activates the parking brake device 5A included in the brake device 5. Also, in step ST12, the traveling control unit 44 may set the shift position of the transmission 4B to a parking position. The action plan unit 43 ends the remote parking processing after executing the processing of step ST12.

Figure 4:
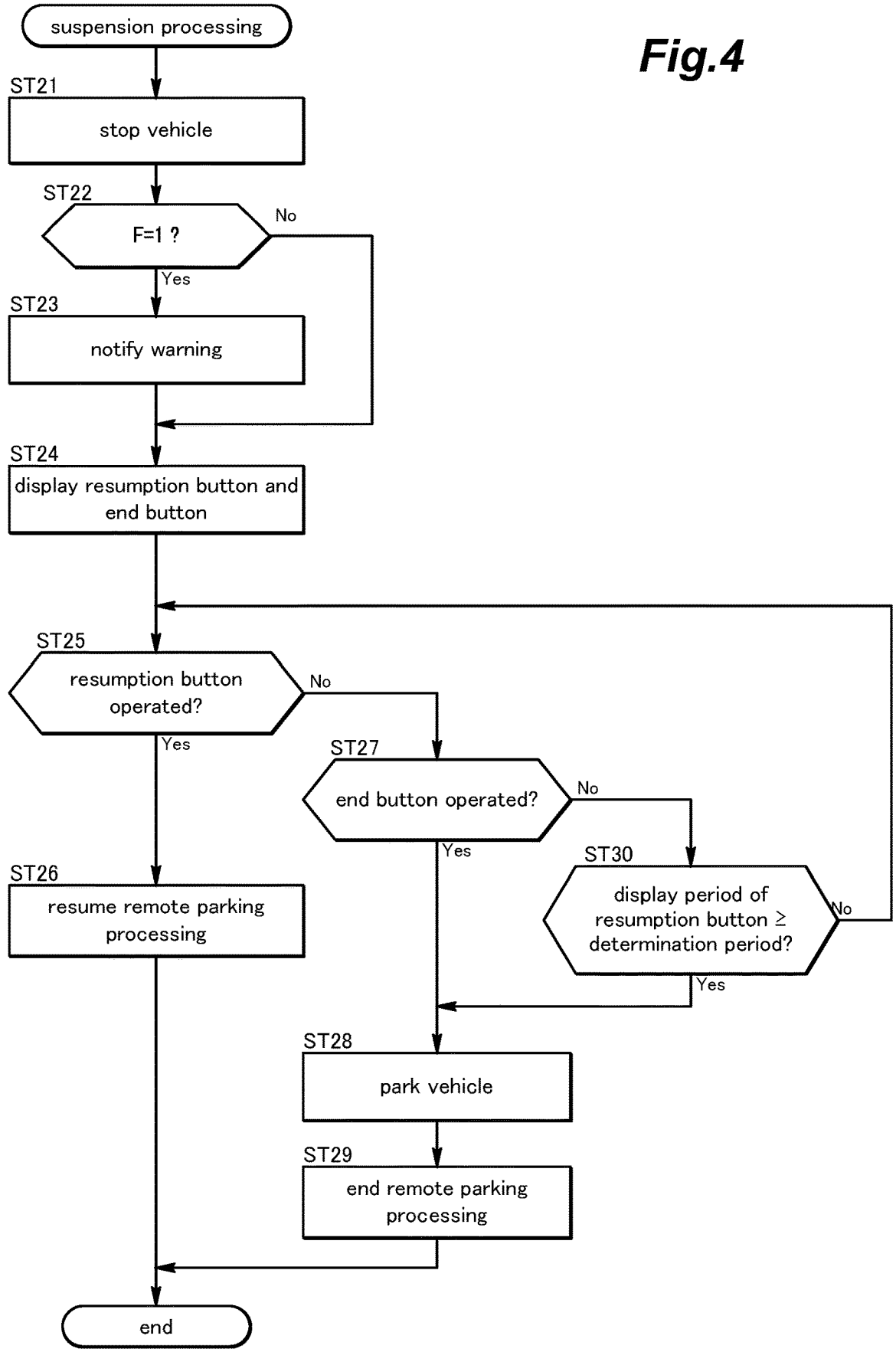
FIG. 4 is a flow chart of suspension processing.

The suspension processing in the remote parking processing is performed according to the procedure shown in FIG. 4. In the suspension processing, the action plan unit 43 first stops the vehicle V (step ST21). The action plan unit 43 outputs a command to the traveling control unit 44 to stop the vehicle V at a prescribed deceleration, thereby the traveling control unit 44 activates the powertrain 4 and the brake device 5.

Next, the action plan unit 43 determines whether the flag F is set to one (step ST22). The flag F is set to zero in a case where the suspension processing is executed in response to an operation of the suspension button 52, and the flag F is set to one in a case where the suspension processing is executed in response to the driving operation from inside the vehicle V. In a case where the action plan unit 43 determines that the flag F is set to one (in a case where the determination result of step ST22 is Yes), the action plan unit 43 makes the input/output unit 30 notify the user of a warning indicating that the driving operation device 11 has been operated, i.e. a warning indicating that the driving operation from inside the vehicle V has been performed (step ST23). The input/output unit 30 may notify the user by a warning display 53 (see FIG. 5B) including a warning image and/or a warning sentence, or may notify the user by generating a warning voice or a warning sound. Thereby, the user can recognize that the driving operation from inside the vehicle V has been performed and that the vehicle V is stopped due to the driving operation from inside the vehicle V. In a case where the action plan unit 43 determines that the flag F is set to zero (in a case where the determination result of step ST22 is No), the action plan unit 43 does not perform the processing of step S23 and proceeds to step ST24.

Figure 5C:
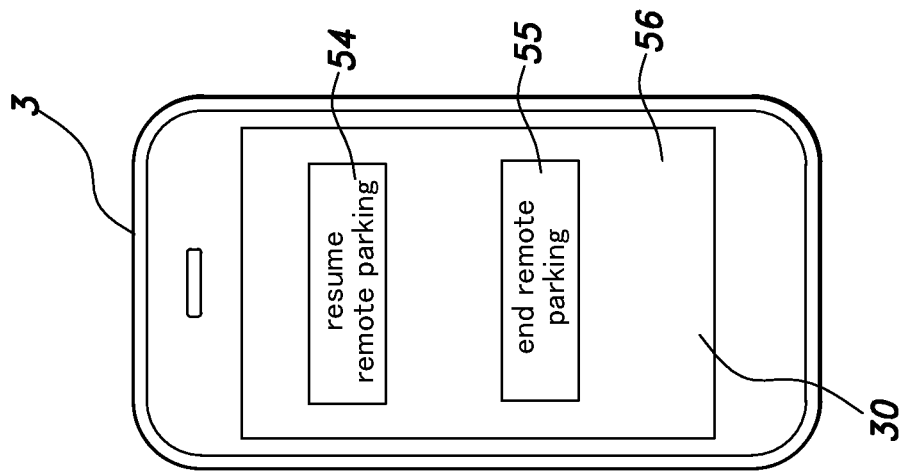
FIG. 5C is a diagram showing a resume/end selection screen displayed on the input/output unit of the operation terminal.
Figure 5B:
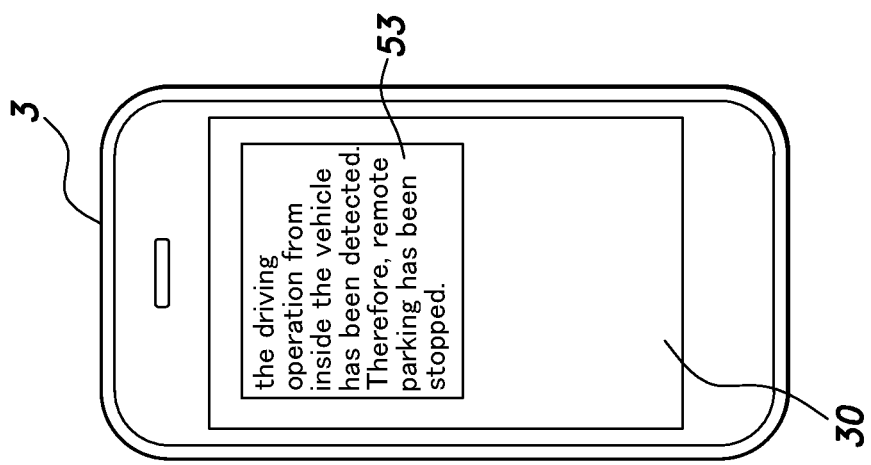
FIG. 5B is a diagram showing a warning screen displayed on the input/output unit of the operation terminal.
Figure 5A:
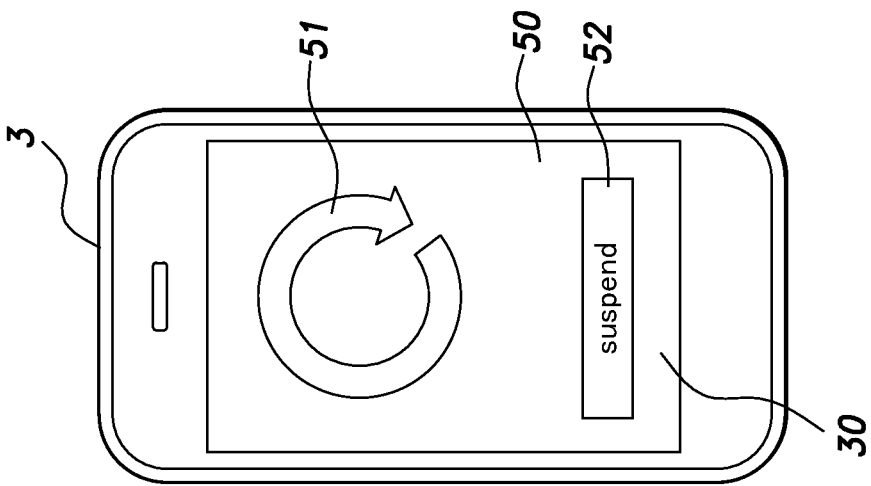
FIG. 5A is a diagram showing a remote operation screen displayed on an input/output unit of an operation terminal.

Next, as shown in FIG. 5C, the action plan unit 43 makes the input/output unit 30 display a resume/end selection screen 56 including a resumption button 54 for resuming the remote parking processing and an end button 55 for ending the remote parking processing (step ST24). The resumption button 54 and the end button 55 may consists of, for example, buttons that accept a tap operation by the user.

Next, the action plan unit 43 determines whether the resumption button 54 has been operated based on a signal from the input/output unit 30 (step ST25). In a case where the action plan unit 43 determines that the resumption button 54 has been operated (in a case where the determination result in step ST25 is Yes), the action plan unit 43 resumes the remote parking processing (step ST26). That is, the action plan unit 43 executes the remote parking processing again from step ST1.

In a case where the action plan unit 43 determines that the resumption button 54 has not been operated (in a case where the determination result in step ST25 is No), the action plan unit 43 determines whether the end button 55 has been operated based on a signal from the input/output unit 30 (step ST27). In a case where the action plan unit 43 determines that the end button 55 has been operated (in a case where the determination result in step ST27 is Yes), the action plan unit 43 parks the vehicle V (step ST28). The action plan unit 43 outputs a command to the traveling control unit 44 to actuate the parking brake device 5A included in the brake device 5. Also, in step ST28, the traveling control unit 44 may set the shift position of the transmission 4B to the parking position. After executing the process of step ST28, the action plan unit 43 ends the remote parking processing (step ST29).

In a case where the action plan unit 43 determines that the end button 55 has not been operated (in a case where the determination result in step ST27 is No), the action plan unit 43 determines whether a display period of the resumption button 54 is equal to or longer than a prescribed determination period (step ST30). Namely, the action plan unit 43 determines whether the period during which the user does not operate either the resumption button 54 or the end button 55 has reached the determination period. In a case where the action plan unit 43 determines that the display period of the resumption button 54 is shorter than the determination period (in a case where the determination result of step ST30 is No), the action plan unit 43 executes step ST25 and the steps thereafter again. In a case where the action plan unit 43 determines that the display period of the resumption button 54 is equal to or longer than the determination period (in a case where the determination result of step ST30 is Yes), i.e. in a case where the user does not operate either the resumption button 54 or the end button 55 during the determination period, the action plan unit 43 executes the processing of step ST28.

In the vehicle control system 1 according to the present embodiment, when the driving operation on the driving operation device 11 is detected, the operation terminal 3 notifies that the driving operation has been detected (namely, the operation terminal 3 notifies that the driving operation device 11 has been operated). Therefore, the user using the operation terminal 3 can recognize that the driving operation has been performed from inside the vehicle V. At this time, it is possible to make sure that the user using the operation terminal 3 is safe since the vehicle V is stopped.

When the suspension processing is executed in the remote parking processing, the user can select whether to resume or end the remote parking processing by operating the resumption button 54 or the end button 55 displayed on the input/output unit 30 of the operation terminal 3. Therefore, when the suspension processing is executed, the user can check an inside of the vehicle V and then select whether to resume or end the remote parking processing. When another user operating the driving operation device 11 is in the vehicle V, the user may operate the end button 55 to end the remote parking processing. Thereby, the user in the vehicle V can operate the driving operation device 11 to move the vehicle V.

When the driving operation on the driving operation device 11 is detected by mistake and the vehicle V is stopped, the user of the operation terminal 3 may operate the resumption button 54 to resume the remote parking processing. For example, in a case where the vehicle V is configured such that the steering wheel 11C rotates according to a steering angle of the wheels W, the steering wheel 11C rotates when the steering angle changes due to a step or rut on the road surface. Therefore, a disturbance such as an input from the road surface may be detected by mistake as the driving operation, so that the suspension processing may be executed. Even in such a case, the user can operate the operation terminal 3 to resume the remote parking processing.

When the end button 55 is operated in the suspension processing to end the remote parking processing, the parking brake device 5A is activated. Therefore, the vehicle V can be reliably held at a position where the vehicle V is stopped. When the remote parking processing ends, the shift position of the transmission 4B is set to the parking position, so that the vehicle V can be reliably held at the position where the vehicle V is stopped.

Also, until the vehicle V travels a prescribed distance after the action plan unit 43 executes the suspension processing and then resumes the remote parking processing, the action plan unit 43 does not execute the suspension processing even when the action plan unit 43 detects the driving operation on the driving operation device 11. Accordingly, in a case where the action plan unit 43 detects the driving operation by mistake due to a disturbance such as a step or rut on the road surface, it is possible to prevent the remote parking processing from being suspended again by the disturbance.

Concrete embodiments of the present invention have been described in the foregoing, but the present invention should not be limited by the foregoing embodiments and various modifications and alterations are possible within the scope of the present invention.

The invention claimed is:

1. A vehicle control system, comprising:
a driving operation device provided in a vehicle and configured to accept a driving operation by a user;
an operation terminal configured to be carried by the user and including an input/output unit configured to accept an input by the user and to output a signal; and
a control device configured to control traveling of the vehicle based on a signal from the driving operation device and to execute remote parking processing to move the vehicle to a parking position based on a signal from the operation terminal,
wherein, when the control device detects the driving operation based on a signal from the driving operation device during the remote parking processing, the control device executes suspension processing to stop the vehicle and to make the input/output unit notify that the driving operation device has been operated,
wherein, in the suspension processing, the control device is configured to make the input/output unit display a resumption button for resuming the remote parking processing, and to resume the remote parking processing when detecting an operation of the resumption button.

2. The vehicle control system according to claim 1, wherein, in the suspension processing, the control device is configured to make the input/output unit display an end button for ending the remote parking processing.

3. The vehicle control system according to claim 2, wherein the control device is configured to actuate a parking brake device when the end button is operated in the suspension processing.

4. The vehicle control system according to claim 2, wherein the control device is configured to set a shift position of a transmission to a parking position when the end button is operated in the suspension processing.

5. The vehicle control system according to claim 2, wherein, until the vehicle travels a prescribed distance after the control device detects the operation of the resumption button and resumes the remote parking processing, the control device does not execute the suspension processing even when the control device detects the driving operation on the driving operation device.

6. The vehicle control system according to claim 1, wherein the driving operation device includes at least one of an accelerator pedal, a brake pedal, a steering wheel, and a shift lever.

7. The vehicle control system according to claim 1, wherein the driving operation device includes a steering wheel configured to rotate according to a steering angle of a wheel.

* * * * *